United States Patent
Wang

(10) Patent No.: US 11,878,850 B2
(45) Date of Patent: Jan. 23, 2024

(54) WRAPPING DEVICE WITH EXTENDABLE BRACKETS FOR SECURING AND SUPPORTING PALLETIZED MATERIALS

(71) Applicant: Hualong Wang, Apex, NC (US)

(72) Inventor: Hualong Wang, Apex, NC (US)

(73) Assignee: Hualong Wang, Apex, NC (US)

( * ) Notice: Subject to any disclaimer, the term of this patent is extended or adjusted under 35 U.S.C. 154(b) by 91 days.

(21) Appl. No.: 17/187,859

(22) Filed: Feb. 28, 2021

(65) Prior Publication Data

US 2022/0274753 A1    Sep. 1, 2022

(51) Int. Cl.
*B65D 71/04*   (2006.01)
*B65B 13/02*   (2006.01)

(52) U.S. Cl.
CPC .............. *B65D 71/04* (2013.01); *B65B 13/02* (2013.01)

(58) Field of Classification Search
None
See application file for complete search history.

(56) References Cited

U.S. PATENT DOCUMENTS

| | | | |
|---|---|---|---|
| 1,770,516 A * | 7/1930 | Griffith | B65D 71/04 206/451 |
| 2,455,237 A | 11/1948 | Davis | |
| 3,152,693 A * | 10/1964 | Anderson | B65D 71/04 217/69 |
| 3,371,815 A | 3/1968 | Macomber | |
| 3,416,652 A * | 12/1968 | Almasy | B65D 71/04 206/453 |
| 4,738,371 A | 4/1988 | Wakeman | |
| 4,852,330 A | 8/1989 | Carangelo | |
| 4,868,955 A | 9/1989 | Magnant | |
| 4,876,841 A | 10/1989 | Jensen | |
| 4,938,357 A * | 7/1990 | Schmidt | B60P 7/0869 217/69 |
| 5,193,955 A | 3/1993 | Chou | |
| 5,226,524 A | 7/1993 | Guttinger et al. | |
| 5,388,702 A | 2/1995 | Jones | |
| 6,099,221 A | 8/2000 | Takagi | |
| 6,224,260 B1 | 5/2001 | Nickell et al. | |
| 6,948,896 B2 | 9/2005 | Zhan et al. | |
| 6,984,431 B2 | 1/2006 | Mass et al. | |
| 7,934,894 B1 | 5/2011 | Temple | |
| 8,302,267 B2 | 11/2012 | Morikawa et al. | |
| 9,162,805 B1 | 10/2015 | Testa et al. | |
| 9,333,978 B2 | 5/2016 | Lato et al. | |
| 9,540,139 B2 | 1/2017 | Baltz | |
| 9,574,289 B2 | 2/2017 | Lieber et al. | |
| 10,208,409 B2 | 2/2019 | Lieber et al. | |
| 10,336,520 B2 | 7/2019 | Popp | |

(Continued)

FOREIGN PATENT DOCUMENTS

| | | | |
|---|---|---|---|
| CN | 203997427 U | 12/2014 | |
| GB | 208618 A * | 12/1923 | ......... B65B 67/1227 |

*Primary Examiner* — Tanzim Imam
(74) *Attorney, Agent, or Firm* — NZ CARR LAW OFFICE

(57) ABSTRACT

Implementations of the present disclosure generally relate to a reusable wrapping device for securing loaded goods on a pallet. Particularly, the wrapping device according to the present disclosure at least one extendable bracket and a wrapping strap. The extendable bracket may be clamped onto a pallet load prior to securing the wrapping strap to the pallet load.

14 Claims, 16 Drawing Sheets

(56) References Cited

U.S. PATENT DOCUMENTS

| | | | |
|---|---|---|---|
| 2002/0094429 A1* | 7/2002 | Geary | B32B 27/08 428/313.5 |
| 2005/0260403 A1* | 11/2005 | Geary | B60P 3/42 206/451 |
| 2007/0289682 A1 | 6/2007 | Young | |
| 2016/0251155 A1 | 9/2016 | Lato | |

* cited by examiner

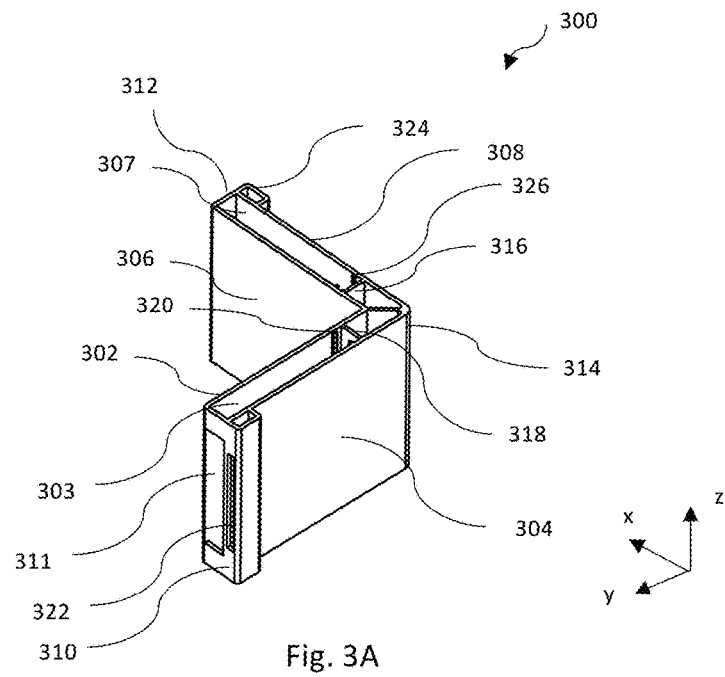
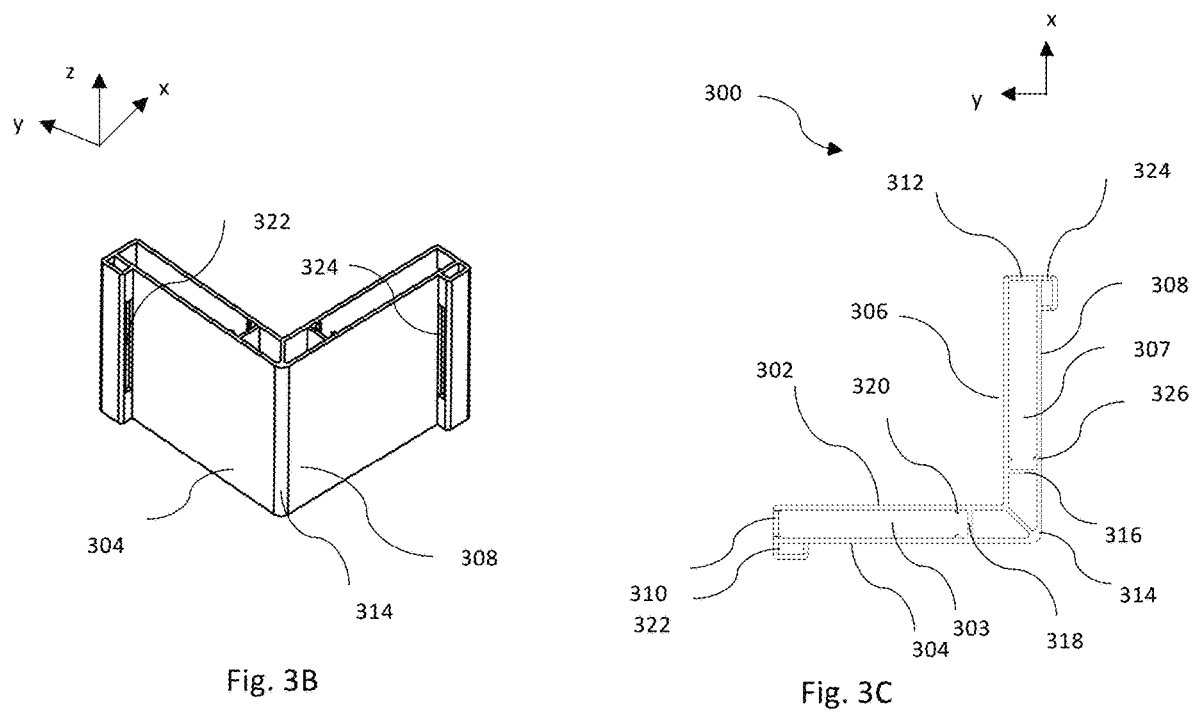
Fig. 3A
Fig. 3B
Fig. 3C

US 11,878,850 B2

WRAPPING DEVICE WITH EXTENDABLE BRACKETS FOR SECURING AND SUPPORTING PALLETIZED MATERIALS

BACKGROUND

Field

Implementations of the present disclosure generally relate device for securing and supporting goods to be transported on a transportation carrier, such as a pallet. More particularly, embodiments of the present disclosure relate to a reusable pallet wrapping assembly including one extendable bracket to clamp to a pallet load to enable easy applying and removing of the reusable wrapping assembly.

Description of the Related Art

Transportation carriers such as pallets are commonly used in the industry for moving loads for shipment. Various articles or containers are stacked on pallets to be moved from one place to another using a forklift or other mechanical device. One issue that may arise during transportation of the pallets is that the articles or containers can shift or fall that would require re-loading or even replacement of damaged articles or containers.

One solution to this issue is through the use of pallet wraps around pallets to hold the wrapped goods in position. However, it is difficult to hold the pallet wrap in place while wrapping the pallet wrap on the pallet load.

Therefore, a need therefore exists for an improved wrapping device for securing goods in a palletized load.

SUMMARY

Implementations of the present disclosure generally relate to wrapping devices for pallet loads. Particularly, the wrapping device according to the present disclosure including one or two extendable brackets for clamping to a pallet load while applying the wrapping device on the pallet load.

Some embodiments of the president disclosure provide a wrapping bracket. The wrapping device includes a first corner assembly, a second corner assembly, a resilient member connected between the first corner assembly and the second corner assembly, and a rigid cover disposed over the resilient member, wherein the first corner assembly and the second corner assembly are slidably connected to the rigid cover and movable relative to each other.

Some embodiments of the present disclosure provide a wrapping device. The wrapping device comprises a first extendable bracket comprising a first corner assembly, a second corner assembly, a resilient member connected between the first corner assembly and the second corner assembly, and a rigid cover disposed over the resilient member, wherein the first corner assembly and the second corner assembly are slidably connected to the rigid cover and movable relative to each other, and a strap movably threaded through the first extendable bracket.

Some embodiments of the present disclosure provide a method for handling a pallet load. The method includes applying a first extendable bracket on the pallet load, wherein the first extendable bracket includes a first corner assembly and a second corner assembly connected by a first resilient member, and the first corner assembly is positioned along a first corner of the pallet load and the second corner assembly is positioned on a second corner of the pallet load, and tying a strap around the pallet load by joining two ends of the strap, wherein the strap is threaded through the first extendable bracket.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIGS. 3A-3B are schematic perspective views of a corner unit according to one embodiment of the present disclosure.

FIG. 3C is a schematic sectional view of the corner unit of FIGS. 3A-3B.

Figure 1A:
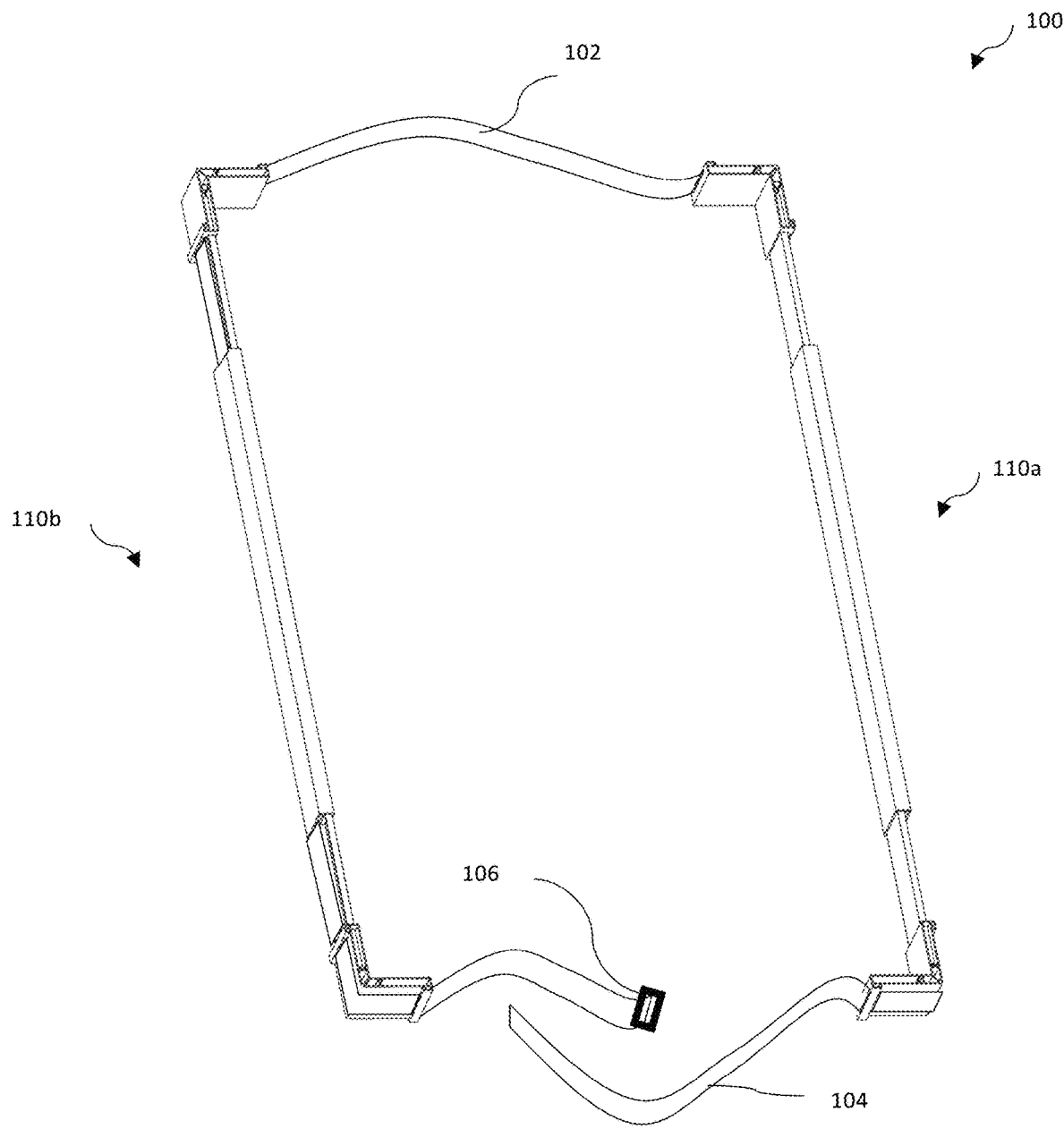
FIG. 1A is a schematic perspective view of a wrapping device according to one embodiment of the present disclosure.

To facilitate understanding, identical reference numerals have been used, where possible, to designate identical elements that are common to the figures. It is contemplated that elements and features of one implementation may be beneficially incorporated in other implementations without further recitation. It is to be noted, however, that the appended drawings illustrate only exemplary implementations of this disclosure and are therefore not to be considered limiting of its scope, for the disclosure may admit to other equally effective implementations.

DETAILED DESCRIPTION

The following disclosure describes a wrapping device for securing goods on a transportation carrier such as a pallet. Details are set forth in the following description and in FIGS. 1-7 to provide a thorough understanding of various implementations of the disclosure. Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Embodiments of the present disclosure relate to a wrapping device for securing and supporting a load on a pallet during storage and transportation. More particularly, embodiments of the present disclosure provide a wrapping device including at least one extendable bracket and a wrapping strap. The extendable bracket may be clamped onto a pallet load prior to securing the wrapping strap to the pallet load. In some embodiments, the extendable bracket may include two corner assemblies connected to each other by a resilient member. During operation, the two corner assemblies are pulled apart to position the extendable bracket over two corners of the pallet load. The corner assemblies are the released to allow the corner assemblies clamping on the corners of the pallet load under compression force from the resilient member. The wrapping strap can then be secured at the proper location. In some embodiments, the wrapping strap is pre-threaded through the extendable bracket.

In some embodiments, the wrapping device incudes two extendable brackets, each having two corner assemblies, threaded by one wrapping strap. During operation, the extendable brackets are first clamped on four corners of the pallet load, the wrapping strap can be tied up to secure contents in the pallet load together.

In other embodiments, the wrapping device may only include one extendable bracket having two corner assemblies, a wrapping strap is threaded through the two corner assemblies. During operation, the extendable bracket is first clamped on two corners of the pallet load, the wrapping strap can be tied up to secure contents in the pallet load together.

In some embodiments, a corner assembly according to the present disclosure may be assembled from two or more components for ease of manufacturing and/or lowered replacement cost. In other embodiments, a corner assembly according to the present disclosure may be formed in one unitary body for optimal structural integrity.

FIG. 1A is a schematic perspective view of a wrapping device 100 according to one embodiment of the present disclosure. The wrapping device 100 includes two extendable brackets 110a, 110b (collectively 110) and a wrapping strap 102. Each extendable bracket 110a, 110b is shaped to clamp on two corners of a pallet load. The wrapping strap 102 may be an elongated flexible belt having a first end 104, and a second end 106. The first end 104 and the second end 106 may be joined together forming a secure connection. In some embodiments, a suitable fastening mechanism, such as adhesives, nesting structures, fasteners, or other fastening structures, may be included in the first end 104 and second end 106 of the wrapping strap 102. The wrapping strap 102 is threaded through the extendable brackets 110a, 110b and configured to be tied around a pallet load. In some embodiments, the wrapping strap 102 is pre-threaded through the extendable brackets 110a, 110b. Alternatively, the wrapping strap 102 may be threaded through or otherwise attached to the extendable brackets 110a, 110b during operation.

During operation, the two extendable brackets 110a, 110b may be extended to place the wrapping device 100 around a pallet load to be wrapped. The extendable brackets 110a, 110b are then released to clamp the extendable brackets 110a, 110b on four corners of the pallet load at a target vertical location. Upon clamping the extendable brackets 110a, 110b on the pallet load, the wrapping device 100 is fixedly placed on the pallet load freeing both hands of the human operator. The human operator can then pull the wrapping strap 102 by one or both ends 104, 106 to secure and tie the wrapping strap 102 around the pallet load to complete the operation. One or more wrapping devices 100 may be applied on a pallet load.

Figure 1B:
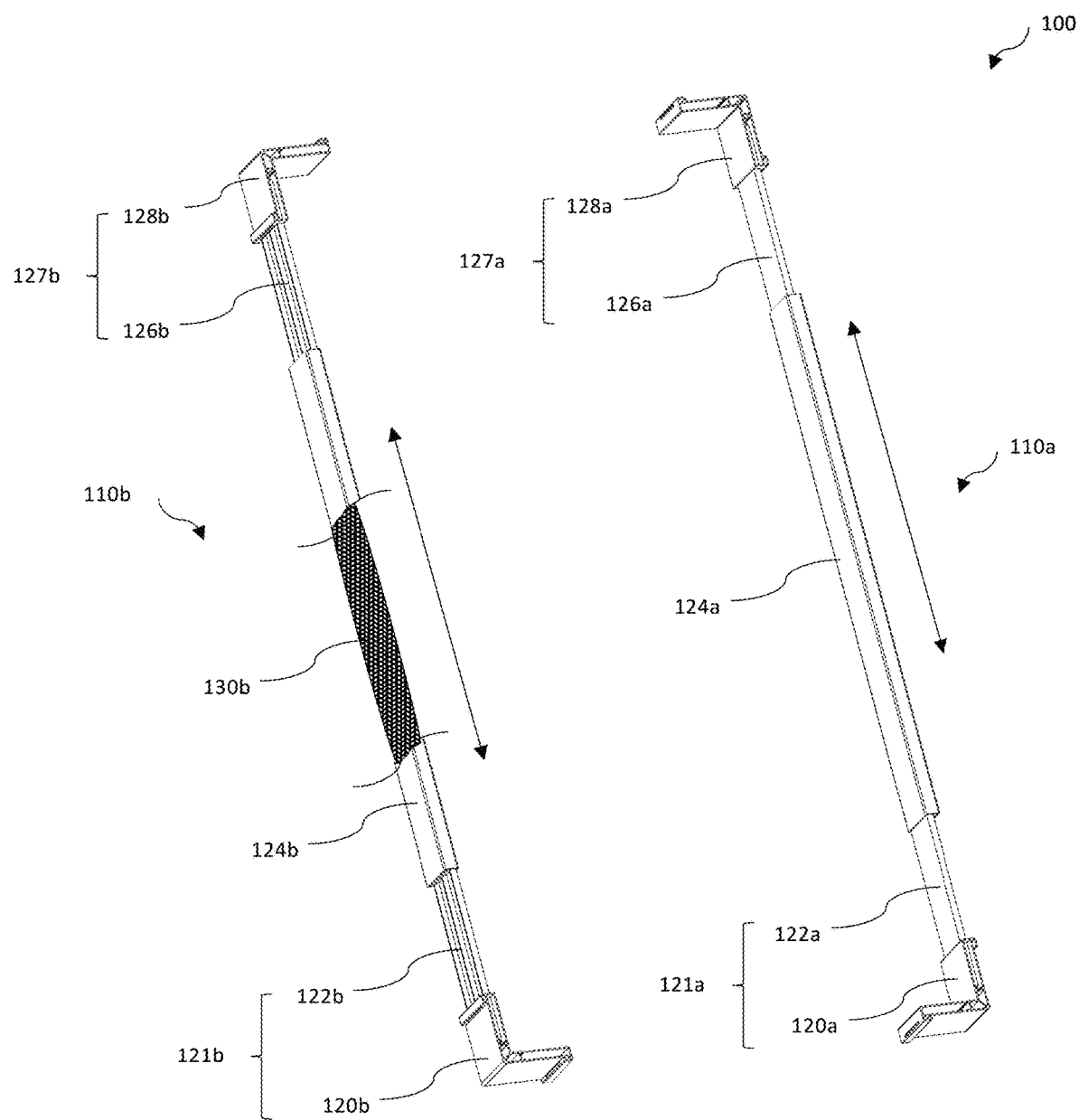
FIG. 1B is a schematic perspective view of the wrapping device of FIG. 1A with extendable brackets in extended position and a wrapping strap removed.

FIG. 1B is a schematic perspective view of the wrapping device 100 with extendable brackets 110a, 110b in an extended position and the wrapping strap 102 removed. In the embodiment shown in FIG. 1B, each extendable bracket 110a, 110b includes a first corner assembly 121a, 121b (collectively 121) and a second corner assembly 127a, 127b (collectively 127). The first corner assembly 121a, 121b and the second corner assembly 127b, 127b are slidably connected to a rigid cover 124a, 125b.

A resilient member 130a (not shown), 130b is positioned within the rigid cover 124a, 124b, (collectively 124). The resilient member 130a, 130b is collectively 130. The resilient member 130a, 130b is in connection with at least one of the first corner assembly 121a, 121b and the second corner assembly 127a, 127b to bias the first and second extendable brackets 110a, 110b towards a retracted position. In some embodiment, the resilient member 130a, 130b is disposed in the rigid cover 124a, 124b, as shown in FIG. 1B. In some embodiments, the resilient member 130a, 130b is connected between the corner assembly 121a, 121b and the second corner assembly 127a, 127b and pulling the corner assembly 121a, 121b towards the second corner assembly 127a, 127b. In other embodiments, the resilient member 130a, 130b is connected between the corner assembly 121a, 121b and the rigid cover 130a, 130b and pulling the corner assembly 121a, 121b towards the rigid cover 130a, 130b. The resilient member 130a, 130b may be any suitable element, such as an elastic band, an elastic belt, a spring, or the suitable structure. In some embodiments, in a natural position in which no external force is applied between the first corner assembly 121a/121b and the second corner assembly 127a, 127b, the resilient member 130a, 130b is extended and exerts a springing force bring the first corner assembly 121a, 121b and the second corner assembly 127a, 127b towards each other.

The first corner assembly 121a, 121b and the second corner assembly 127a, 127b may have same or different structures. In some embodiments, the first corner assembly 121a, 121b and the second corner assembly 127a, 127b are substantially identical and symmetrically arranged in the extendable brackets 110a, 110b. As shown in FIG. 1B, each of the first corner assembly 121a, 121b includes a corner unit 120a, 120b (collectively 120) and a sliding bar 122a, 122b (collectively 122) attached to the corner unit 120a, 120b. In some embodiments, the sliding bar 122a, 122b may be fixedly attached to the corner unit 120a, 120b. In other embodiments, the sliding bar 122a, 122b and the corner unit 120a, 120b are formed together as a unitary unit. The sliding bar 122a, 122b is movably connected to the rigid cover 124a, 124b. In one embodiment, the sliding bar 122a, 122b may slide along a channel formed within the rigid cover 124a, 124b. In some embodiments, the resilient member 130a, 130b is attached to the sliding bar 122a, 122b.

Similarly, the second corner assembly 127a, 127b includes a corner unit 128a, 128b (collectively 128) and a sliding bar 126a, 126b (collectively 126) attached to the corner unit 128a, 128b. In some embodiments, the sliding bar 126a, 126b may be fixedly attached to the corner unit 120a, 120b. In other embodiments, the sliding bar 122a, 122b and the corner unit 128a, 128b are formed together as a unitary unit. The sliding bar 126a, 126b is movably connected to the rigid cover 124a, 124b. The resilient member 130a, 130b is attached to the sliding bar 126a, 126b.

In some embodiments, the extendable bracket 110a, 110b includes strap retainers to hold the wrapping strap 102 along the length of the extendable bracket 110a, 110b. In some embodiments, strap retainers may be formed through the corner units 120a, 120b, 128a,128b, and the rigid cover 130a, 130b.

Figure 1C:
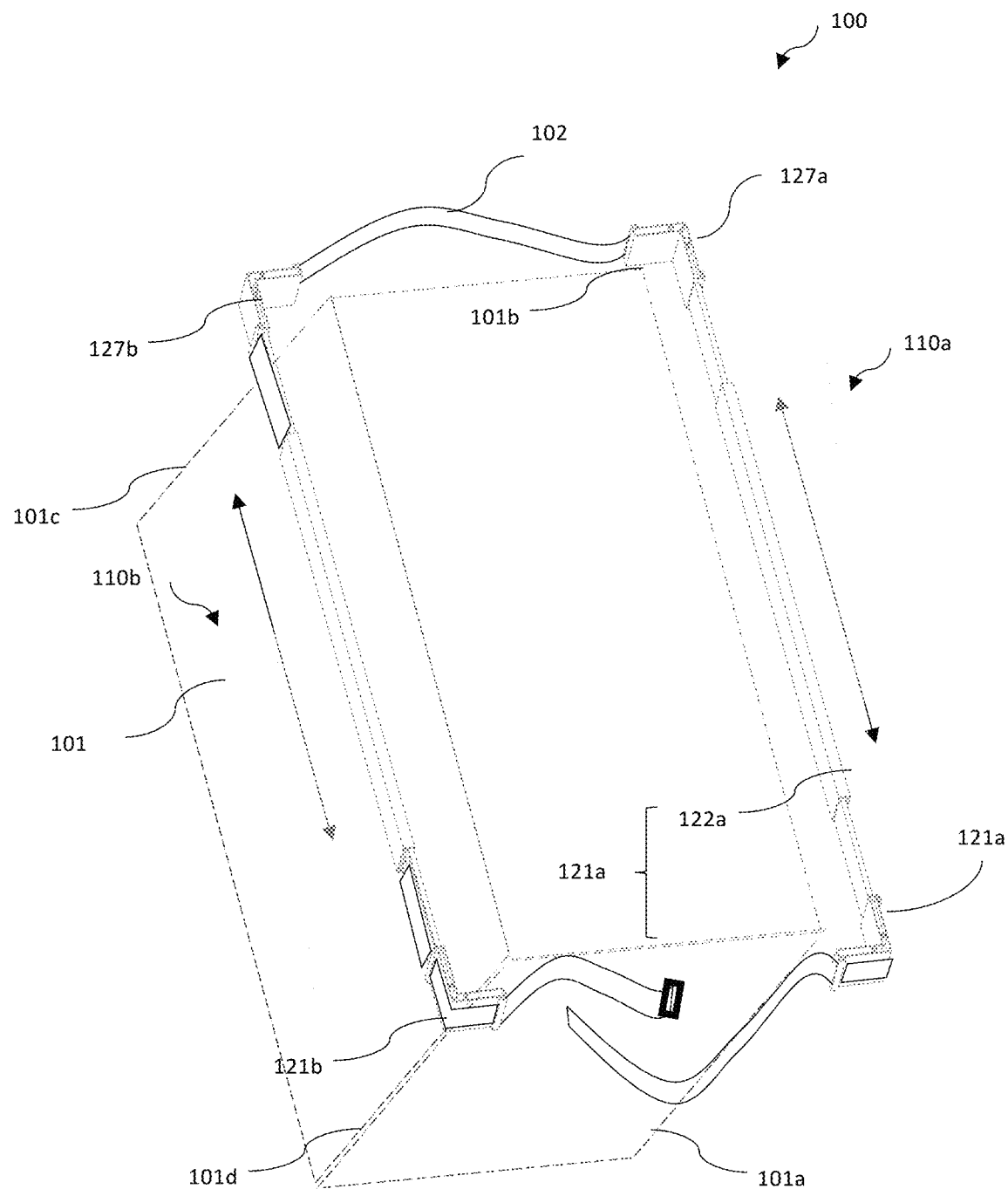
FIGS. 1C and 1D schematically show the wrapping device 100 being applied on a pallet load.
Figure 1D:
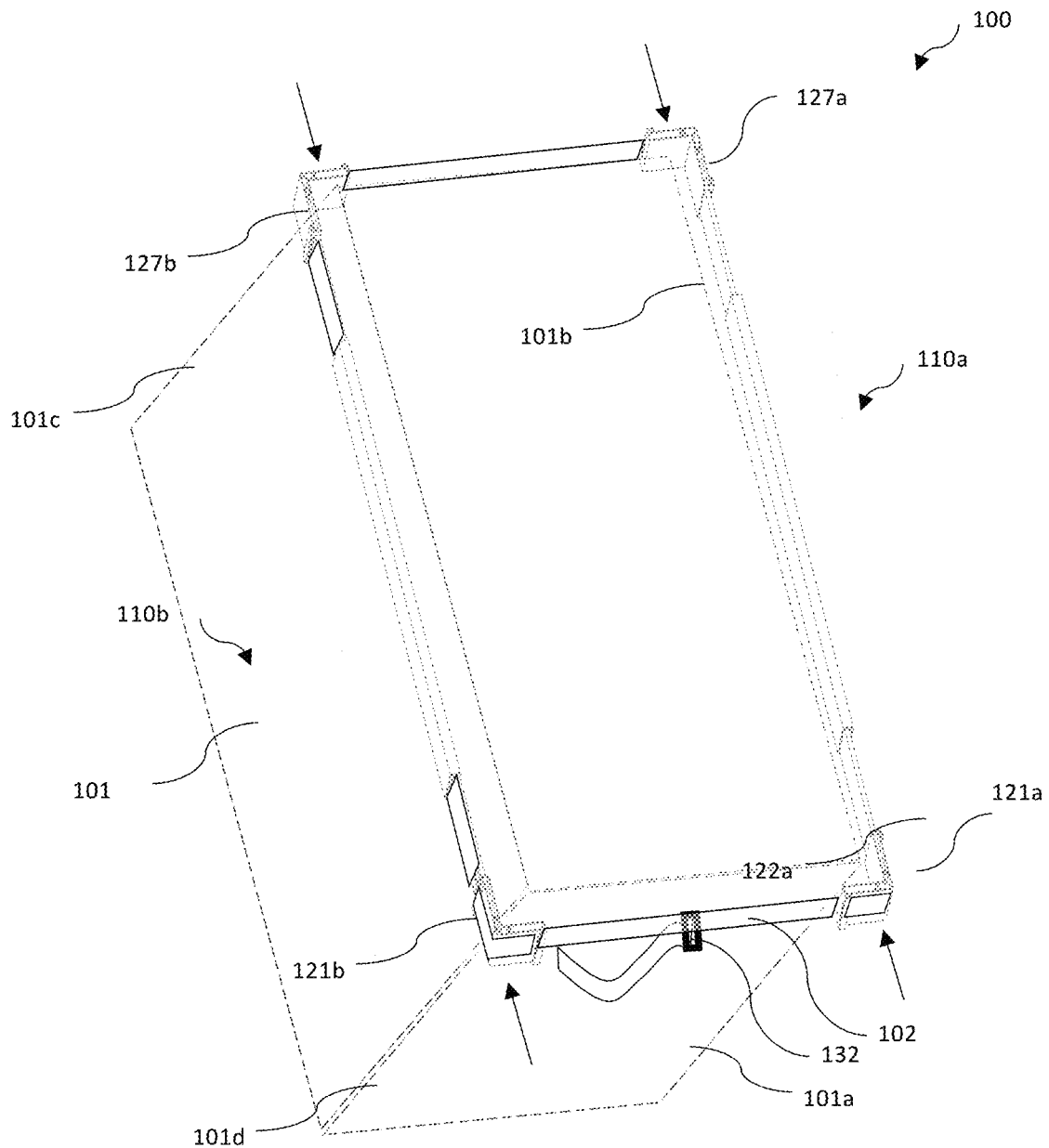

FIGS. 1C and 1D schematically show the wrapping device 100 being applied on a pallet load 101. The pallet load 101 is shaped in a rectangular column having for four corners 101a, 101b, 101c, 101d. To apply the wrapping device 100 on the pallet load 101, an operator may pull the first corner assembly 121a, 121b relative to the second corner assembly 127a, 127b to place the pallet load 101 within the wrapping device 100, i.e. within a perimeter defined by the first and second extendable brackets 110a, 110b, as shown in FIG. 1C. The corner assemblies 121a, 127a, 127b, 121b of the wrapping device 100 are aligned with the corners 101a, 101b, 101c, 101d of the pallet load 101. The operator may move the wrapping device 100 vertically along the pallet load 101 to position the wrapping device 100 at a target vertical level.

After placing the wrapping device 100 in the target level of the pallet load 101, the operator may release the pulling force applied between the first corner unit 120a, 120b the second corner unit 128a, 128b to let the extendable bracket 110a, 110b return towards the natural position under the springing force of the resilient member 130a, 130b. The extendable bracket 110a, 110b is then clamped on the pallet load 101 under the springing force of the resilient member 130a, 130b. Particularly, the corner assemblies 121a, 127a, 127b, 121b of the wrapping device 100 are clamped onto the corners 101a, 101b, 101c, 101d of the pallet load 101, as shown in FIG. 3C. At this stage, the operator may pull the wrapping strap 102 through the strap retainers in the extendable brackets 110a, 110b to tighten the wrapping strap 102 around the pallet load 101 and form a secure joint 132 and complete the wrapping process.

Clamping or placing the wrapping device 100 on the pallet load 101 making it easier to fastening the wrapping strap 102, thus, facilitating convenient application. For example, a single operator may apply the wrapping device 100 around a pallet load easily.

Even though one wrapping device 100 is shown wrapping around the pallet load 101, two or more wrapping devices 100 may be applied at various vertical levels on the pallet load 101 if needed.

Figure 1E:
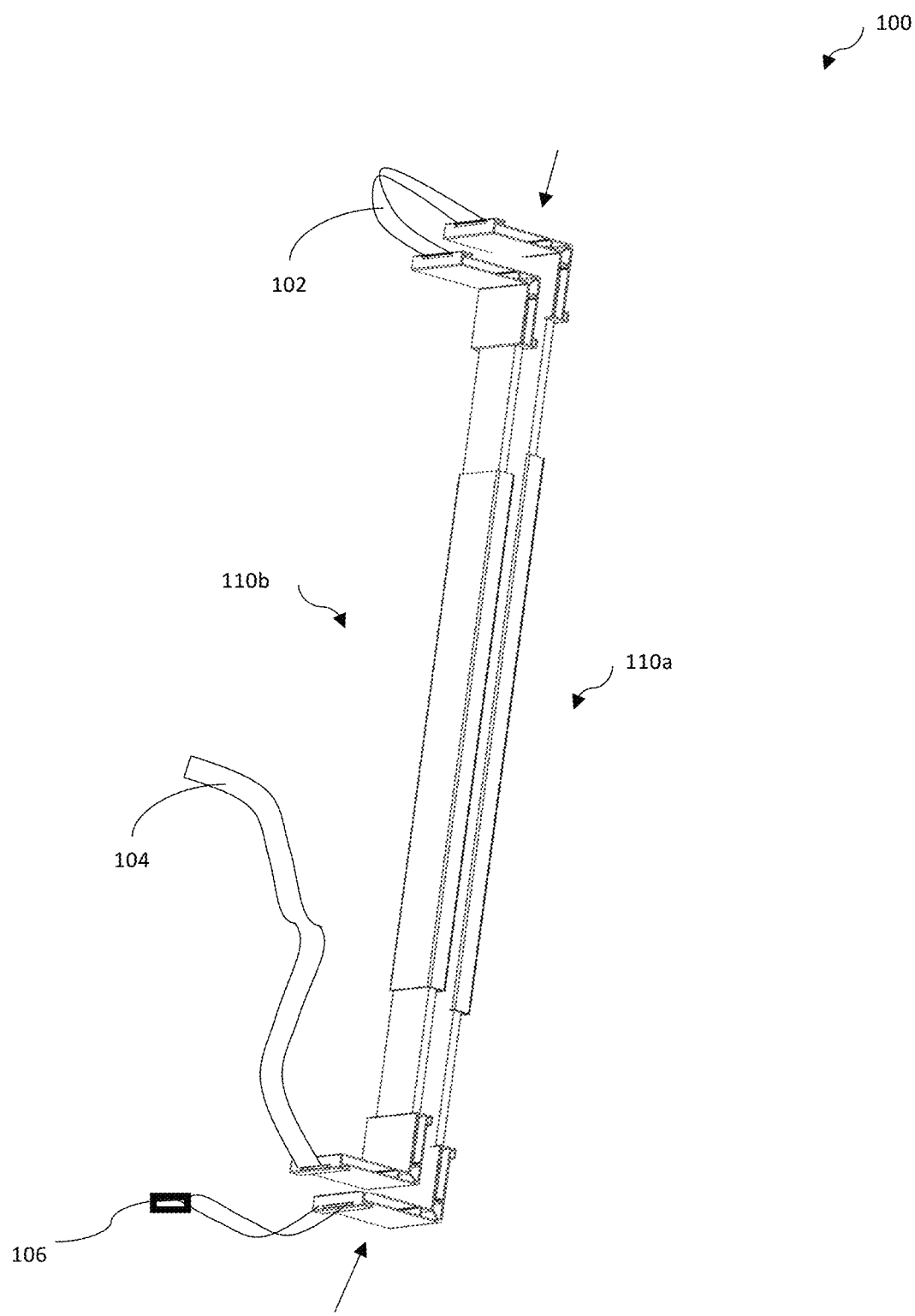
FIG. 1E is a schematic perspective view of the wrapping device in a storing position.

The extendable brackets 110a, 110b may be nested together for easy storage. FIG. 1E is a schematic perspective view of the wrapping device 100 in a storing position. Because the resilient member 130a, 130b is under the tension and exerts pulling force to bias the corner assemblies 121a, 121b and the corner assemblies 127a, 127b toward each other, the extendable bracket 110a may clamped outside the extendable bracket 110b forming a nesting arrangement during storage. The nesting arrangement prevents the extendable brackets 110a, 110b from separation from each other, and reduces entanglement of the wrapping strap 102 as well.

Figure 2A:
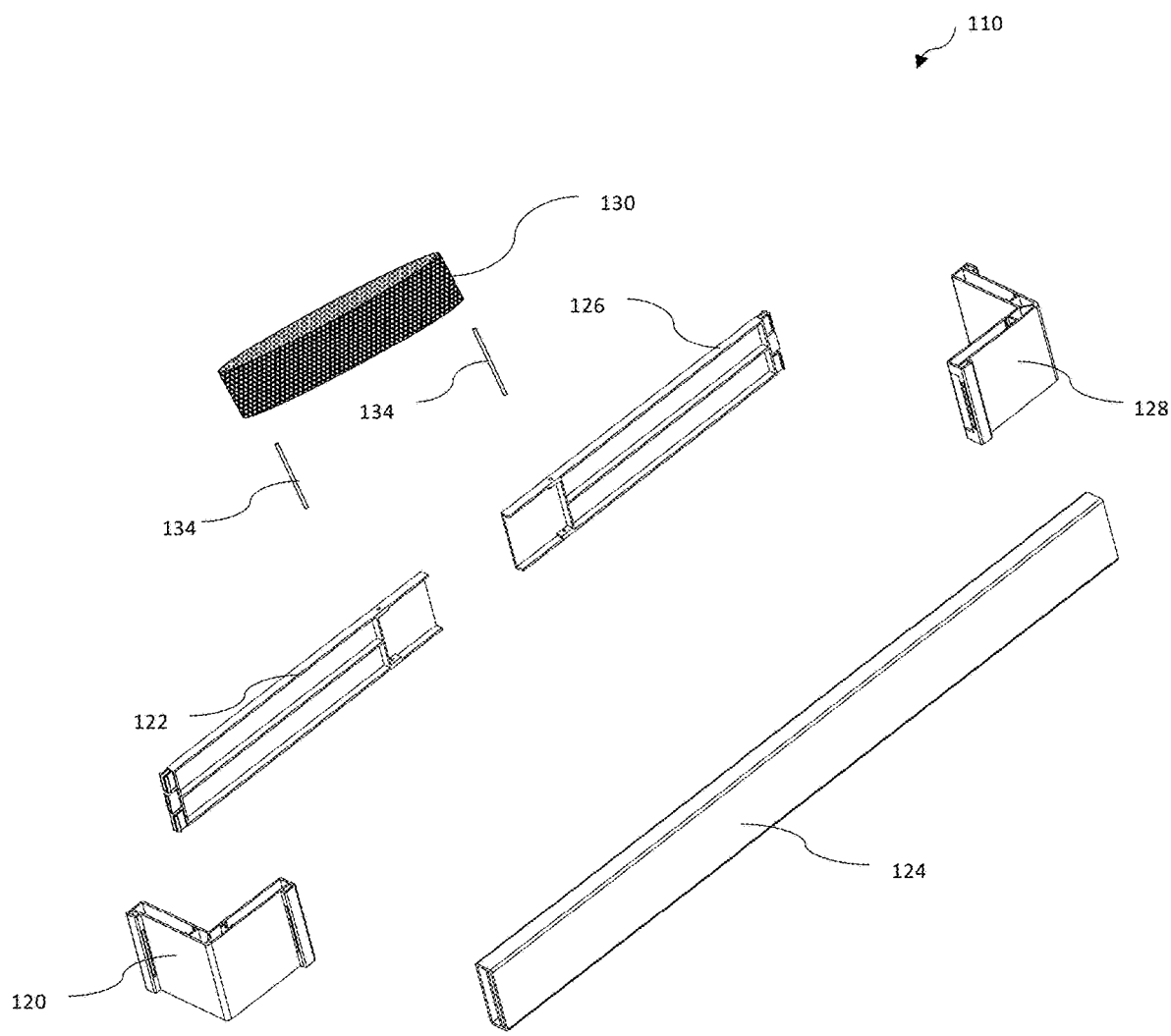
FIG. 2A is a schematic exploded view of an extendable bracket according to the present disclosure.
Figure 2B:
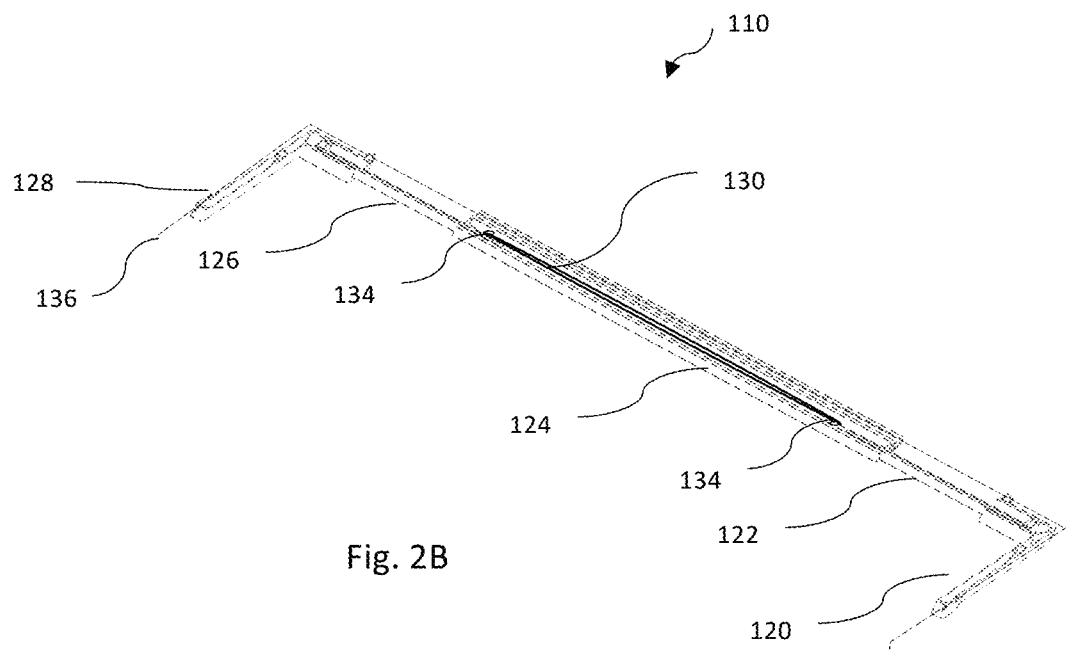
FIG. 2B is a schematic perspective sectional view of the extendable bracket at an extended position.
Figure 2C:
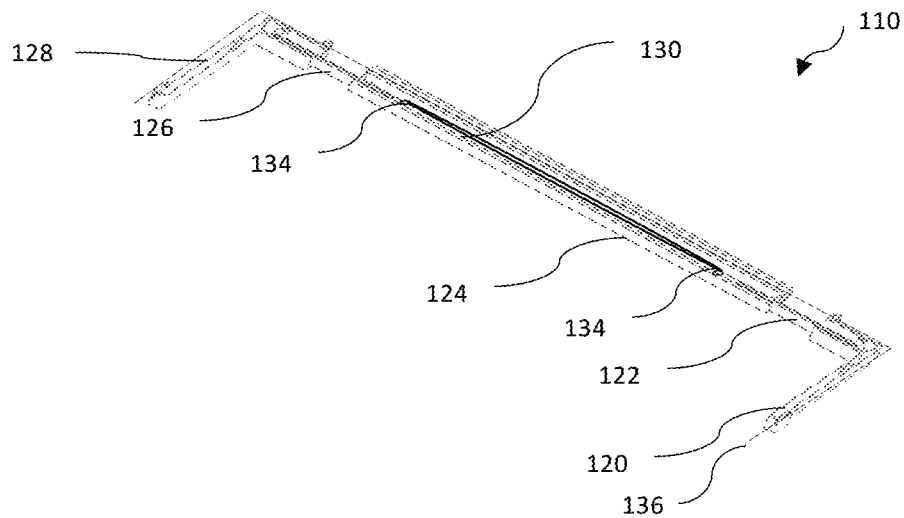
FIG. 2C is a schematic perspective sectional view of the extendable bracket at a retracted position.

FIG. 2A is a schematic exploded view of the extendable bracket 110 according to one embodiment of the present disclosure. FIG. 2B is a schematic perspective sectional view of the extendable bracket 110 at an extended position. FIG. 2C is a schematic perspective sectional view of the extendable bracket 110 at a retracted position. As shown in FIG. 2A, the resilient member 130 may be a loop of elastic belt. Two pins 134 are inserted into the loop of the resilient member 130 then attached to the sliding bars 122, 126 forming an elongated assembly including the corner assemblies 121, 127 connected by the resilient member 130. The elongated assembly is then inserted into the rigid cover 124 with ends of the sliding bars 122, 126 extending out of the rigid cover 124. The corner unit 120 is then attached to the sliding bar 122 and the corner unit 128 is attached to the sliding bar 126. Dash line 136 in FIGS. 2B, 2C indicates a path for the wrapping strap 102 through the extendable bracket 110.

FIGS. 3A-3B are schematic perspective views of a corner unit 300 according to one embodiment of the present disclosure. FIG. 3C is a schematic sectional view of the corner unit 300. The corner unit 300 may be used to embrace a corner of a pallet load and retain a wrapping strap around the corner of the pallet load. For example, the corner unit 300 may be used in place of the corner units 120, 128 in the wrapping device 100.

The corner unit 300 include two planar sections forming an angle of about 90 degrees. In some embodiments, the corner unit 3 may be an angular piece with two symmetrical sides for easy assembly. In some embodiments, the corner unit 300 may be a hollow angular piece. Hollow features need less material without sacrificing structural integrity. In some embodiments, the corner unit 3 may include various connecting thin walls along the same axis, such as z-axis, thus enabling fabrication by an extrusion molding process, which is low cost.

The corner unit 300 may include two inner walls 302, 306 and two outer walls 304, 308. As shown in FIG. 3A, the inner wall 302 is parallel to the y-z plane and the inner wall 306 is parallel to the x-z plane. The inner walls 302, 306 form an angle of about 90 degrees. The inner walls 302, 306 is configured to flush against a pallet load during operation. The outer walls 304, 308 are opposing the inner walls 302, 306 respectively, and are configured to contact a wrapping strap during operation. An end wall 310 joins the inner wall 302 and the outer wall 304 at one end. An end wall 312 joins the inner wall 306 and the outer wall 308 at another end. The outer walls 304, 308 join each other at a ridge 314 along the z-axis. In some embodiments, the ridge 314 is substantially rounded to enable easy gliding of the wrapping strap.

An inner volume 303 is defined by the inner wall 302, the end wall 310, and the outer wall 304. Similarly, an inner volume 307 is defined by the inner wall 302, the end wall 310, and the outer wall 304. The inner volume 303 or 307 may be receive a sliding bar to form a corner assembly, such as the corner assembly 121 or 127. In some embodiments, an opening 311 may be formed through the end wall 310 for receiving a sliding bar. In some embodiments, a stopper 318 is formed in the inner volume 303 between the inner wall 302 and the outer wall 304. One or more retaining walls 320 may be formed in the inner volume 303. The stopper 318 and the retaining walls 320 are positioned to secure a sliding bar in the inner volume 303 in the corner unit 300. Similarly, a stopper 316 is formed in the inner volume 307 between the inner wall 306 and the outer wall 308. One or more retaining walls 326 may be formed in the inner volume 307. The stopper 316 and the retaining walls 326 are positioned to secure a sliding bar in the inner volume 307 of the corner unit 300. In some embodiments, strap retainers 322, 324 may be formed over the outer walls 304, 308 respectively to keep a wrapping strap. In some embodiments, the strap retainers 322, 324 may be slots formed through walls of extending from the outer walls 304, 308.

Figure 4A:
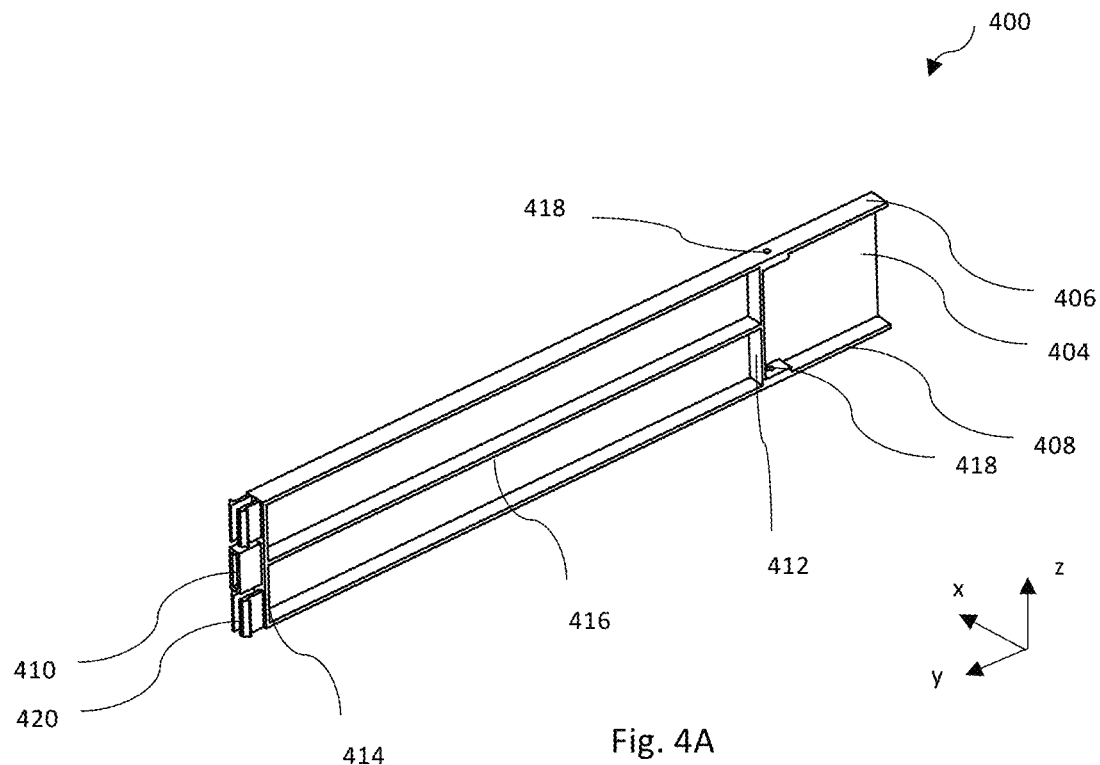
FIGS. 4A-4B are schematic perspective views of a sliding bar according to one embodiment of the present disclosure.
Figure 4B:
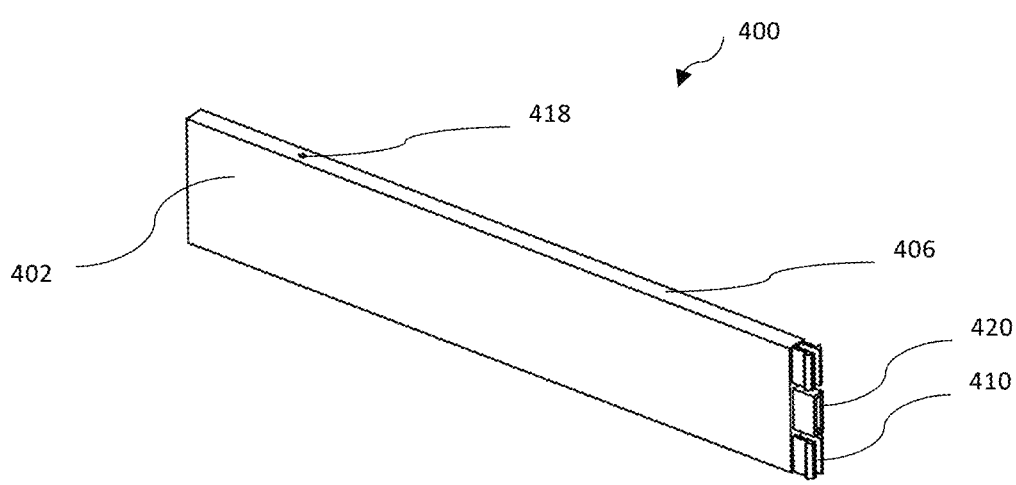
Figure 4C:
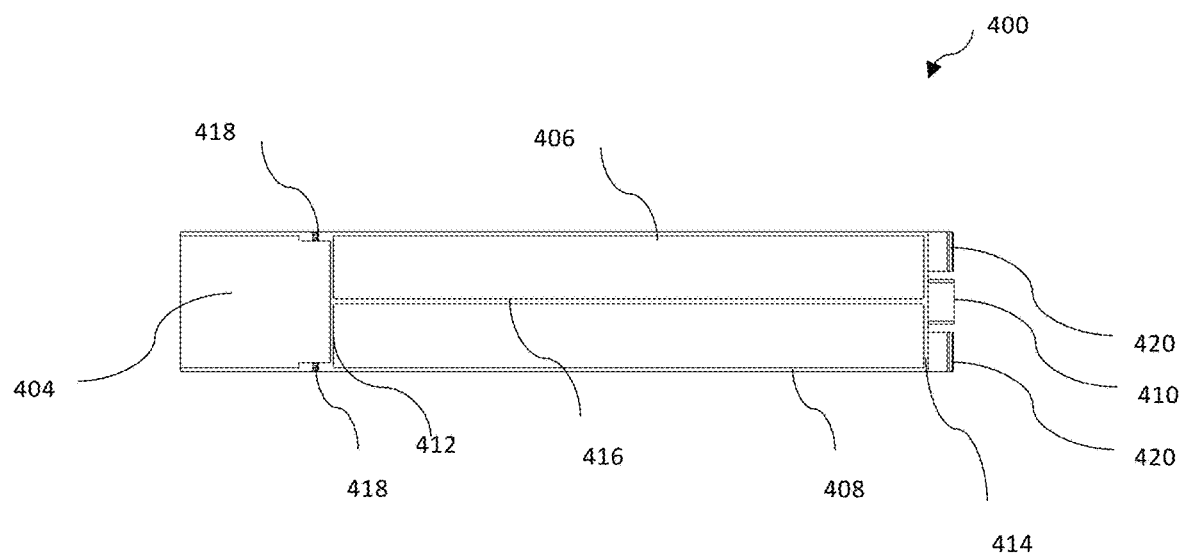
FIG. 4C is a schematic side view of the sliding bar of FIGS. 4A-4B.

FIGS. 4A-4B are schematic perspective views of a sliding bar 400 according to one embodiment of the present disclosure. FIG. 4C is a schematic side view of the sliding bar 400. The sliding bar 400 may be used to form a wrapping device. For example, the sliding bar 400 may be used in place of the sliding bars 122, 126 in the wrapping device 100.

The sliding bar 400 may include an elongated body having a first surface 402 and a second surface 404 opposing the first surface 402. The first surface 402 may be substantial planar for facing a pallet load during operation. An upper wall 406 and a lower wall 408 may extend from the second surface 404 forming a column. An end wall 414 may extend from the second surface 404 on one end of the sliding bar 400 connecting the upper wall 406 and the lower wall 408.

In some embodiments, one or more clips 420 may extend from the end wall 414 along the y-axis. The clips 420 may be used secure the sliding bar 400 in a corner unit, such as the corner unit 300. In some embodiments, each clip 420 may include a cook at a distal end to engage with a retainer in the corner unit 300. In some embodiments, a stopper 410 may extend from the end wall 414 along the y-axis. The stopper 410 may extend beyond the clips 420 in the y-axis to prevent the clips 420 from crushing into the stopper 316, 318 in the corner unit 300.

In some embodiments, openings 418 may be formed through the upper walls 406 and a lower wall 408. The openings 418 are configured to receive the pin 134 for holding the resilient member 130. In some embodiments, a divider wall 412 may be formed on the second surface 404 between the upper wall 406 and the lower wall 408. The divider wall 412 is positioned to prevent the resilient member 130 from moving out of place. In some embodiment, an enforcement wall 416 may be formed near a central region between the divider wall 412 and the end wall 414.

Figure 4D:
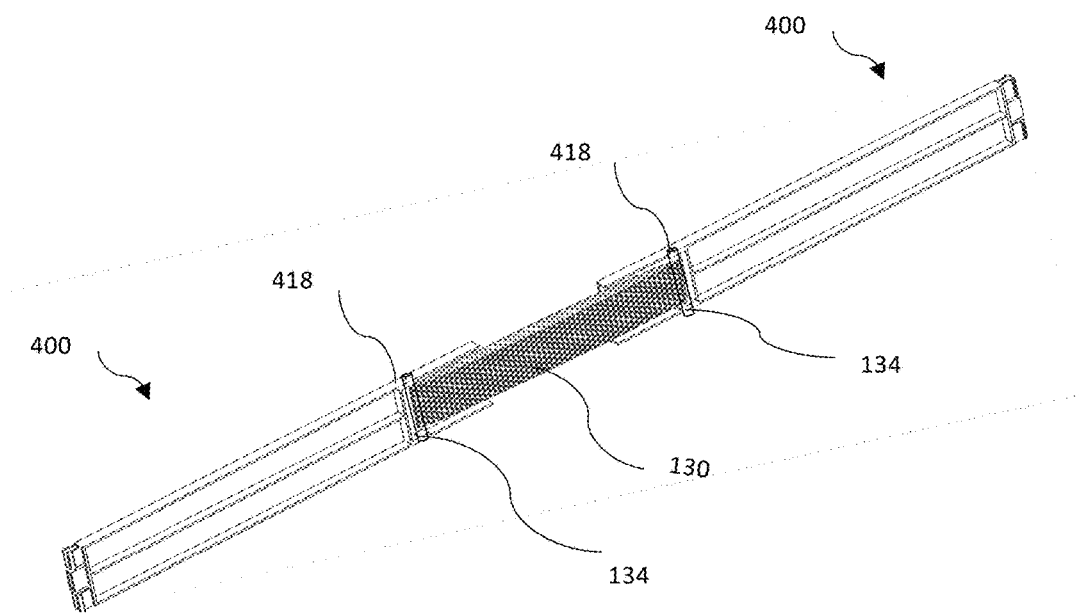
FIG. 4D is a schematic perspective view showing connection between sliding bars by a resilient member.

The sliding bar 400 is connected between a corner unit 300 and a resilient member in an extendable bracket. FIG. 4D is a schematic perspective view showing connection between sliding bars 400 by a resilient member in an extendable bracket.

Figure 4E:
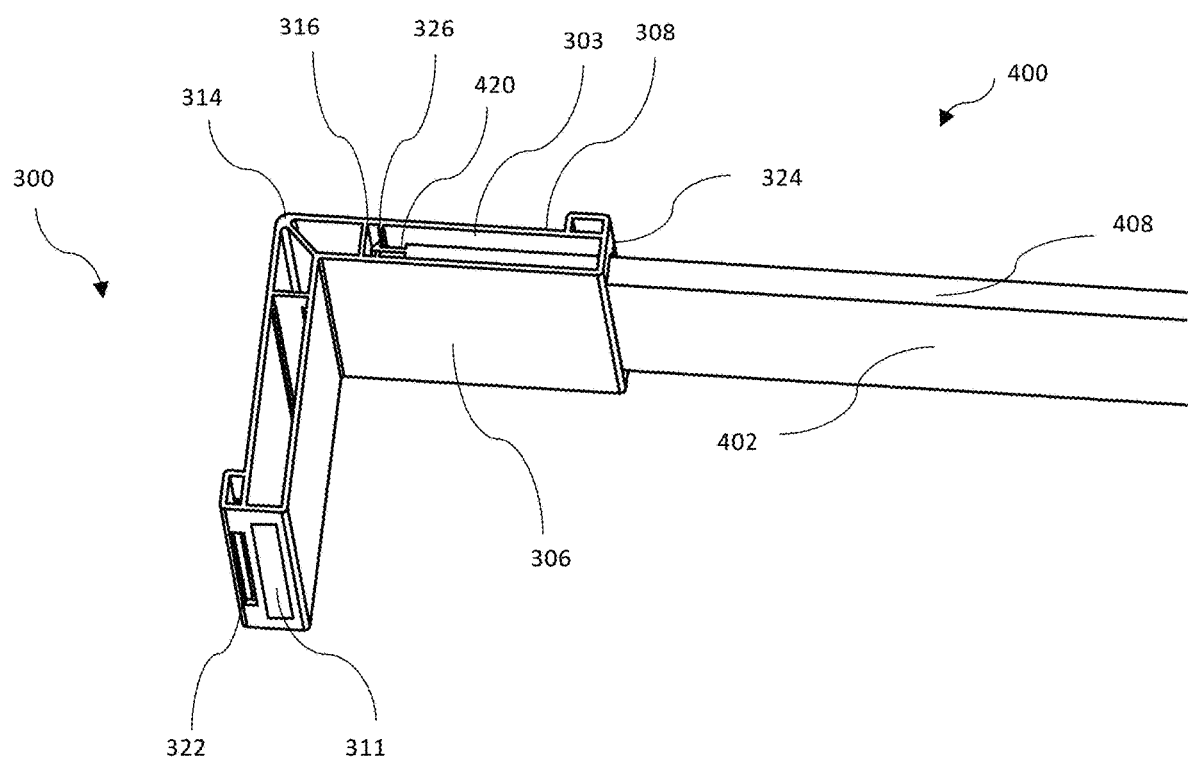
FIG. 4E is a schematic partial perspective view of the sliding bar connecting to a corner unit.

FIG. 4E is a schematic partial perspective view of the sliding bar 400 connecting to the corner unit 300. As shown in FIG. 4E, the clips 420 in the sliding bar 400 are engaged with the retaining wall 326 in the corner unit 300 so that the sliding bar 400 cannot be pulled out from the corner unit 300. The stopper 316 in the corner unit 300 contacts the stopper 410 of the sliding bar 400 preventing the sliding bar 400 from moving further into the corner unit 300.

Figure 5A:
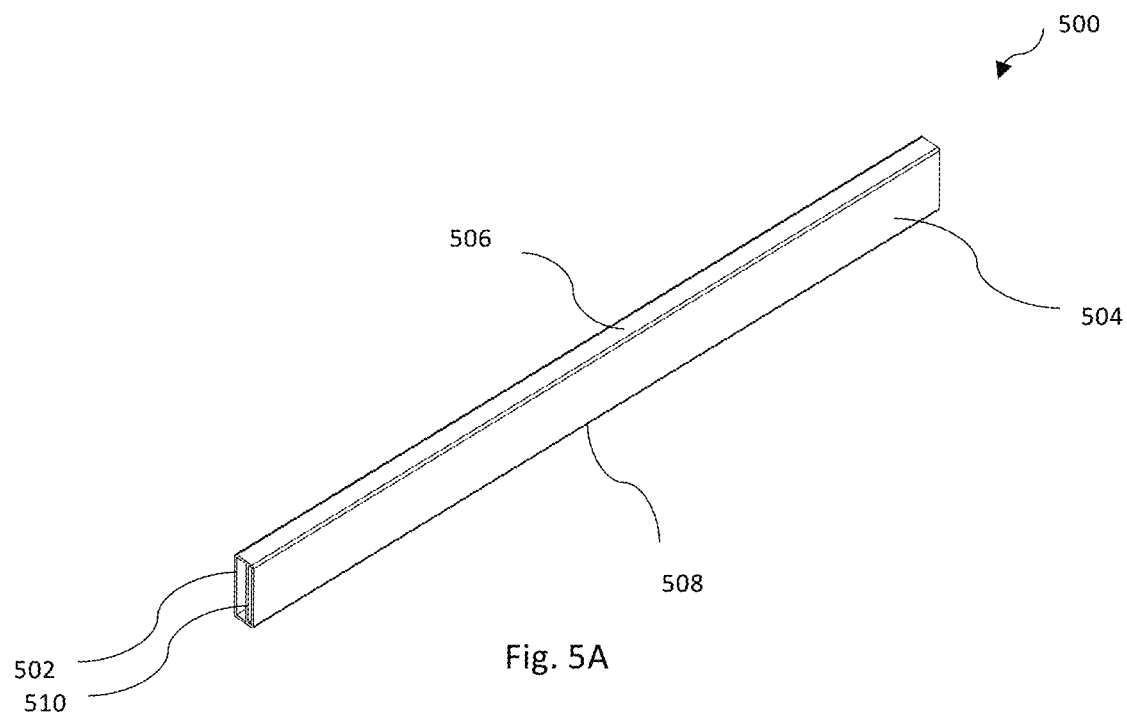
FIG. 5A is a schematic view of a rigid cover according to one embodiment of the present disclosure.
Figure 5B:
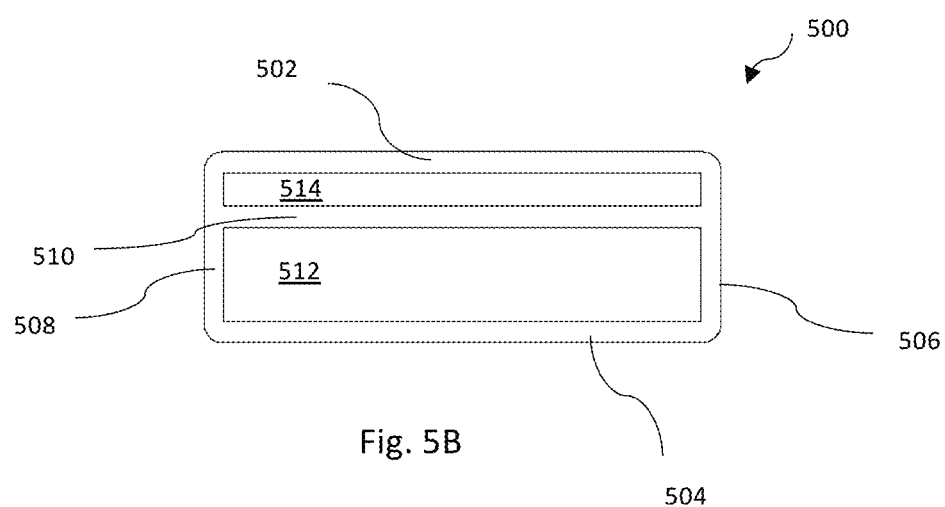
FIG. 5B is a schematic view of the rigid cover of FIG. 5A.

FIG. 5A is a schematic view of a rigid cover 500 according to one embodiment of the present disclosure. FIG. 5B is a schematic view of the rigid cover 500. The rigid cover 500 may be used to form a wrapping device. For example, the rigid cover 500 may be used in place of the rigid cover 124 in the wrapping device 100.

The rigid cover 500 may be a hollow elongated body formed by four side walls 502, 504, 506, 508. The rigid cover 500 further includes an inner wall 510 dividing an inner volume to a first channel 514 and a second channel 512. In some embodiments, the rigid cover 500 may be fabricated by an extrusion molding process.

Figure 5C:
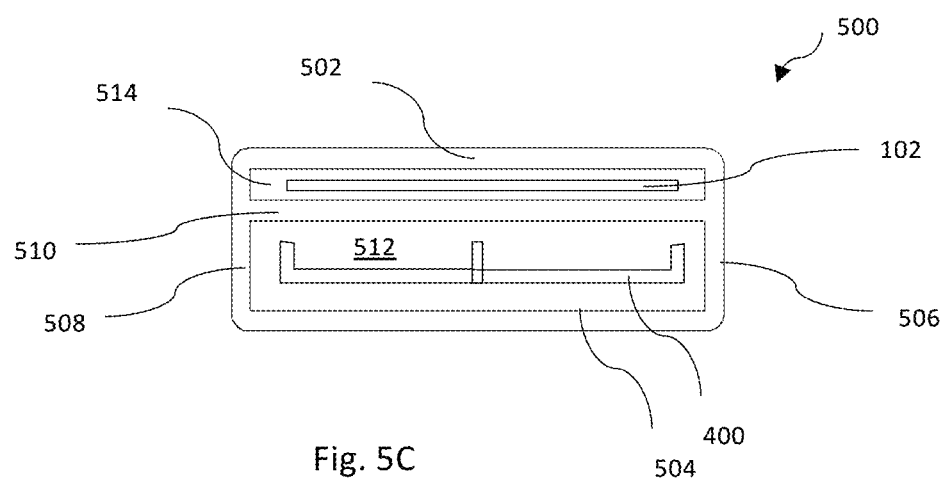
FIG. 5C is a schematic view of the rigid cover with a wrapping belt and a sliding bar threaded therethrough.

FIG. 5C is a schematic view of the rigid cover 500 with a wrapping strap 102 disposed in the first channel 514 and the sliding bar 400 disposed in the second channel 512. The inner wall 510 prevents the wrapping strap 102 from interfering with the sliding bar during operation.

Figure 6A:
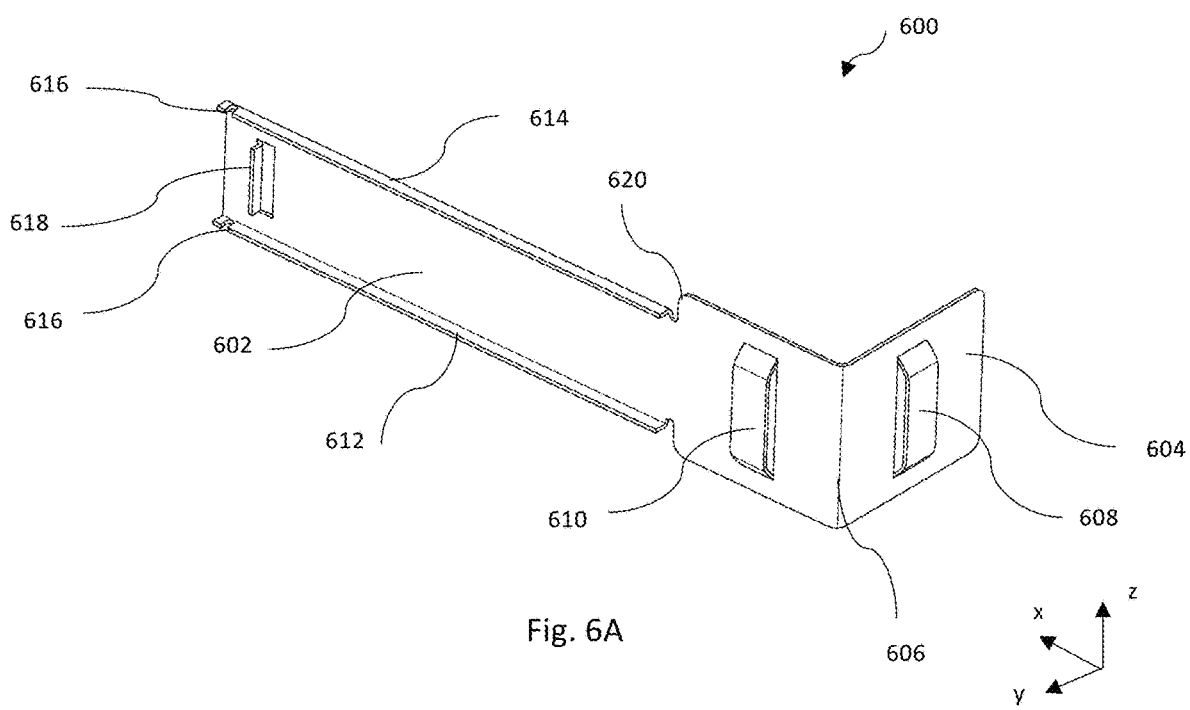
FIG. 6A is a schematic view of a corner assembly according to another embodiment of the present disclosure.
Figure 6B:
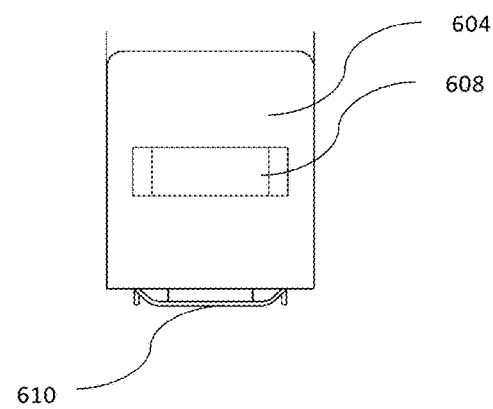
FIG. 6B is a schematic side view of the corner assembly of FIG. 6A.
Figure 6C:
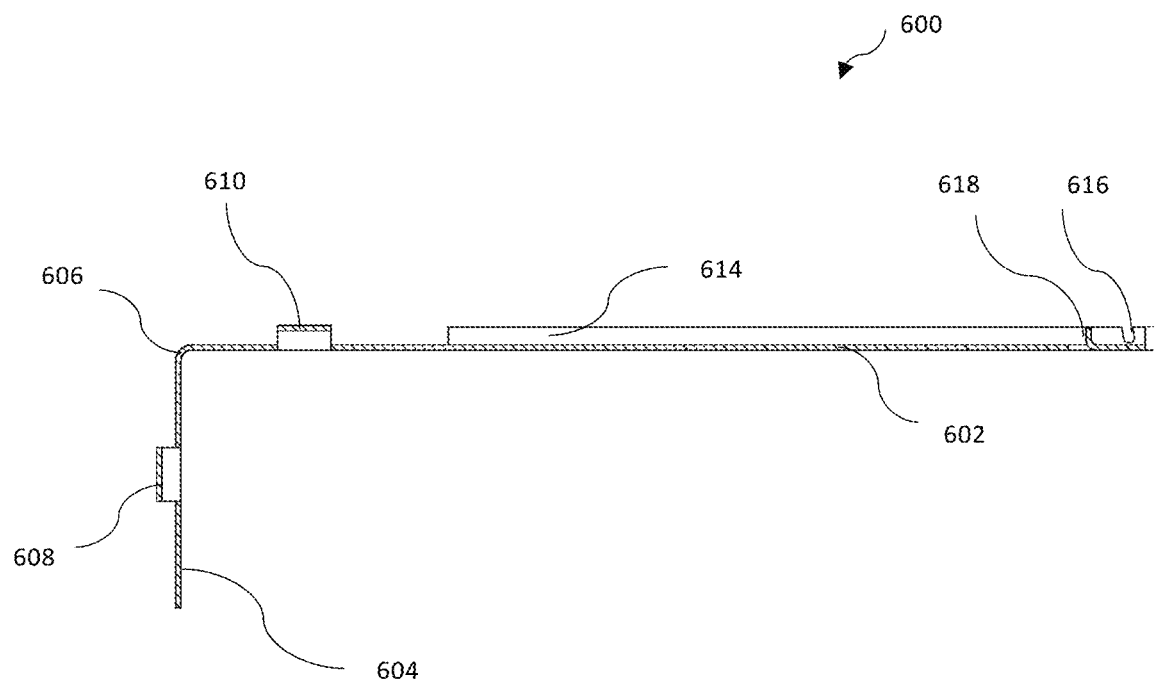
FIG. 6C is a schematic sectional view of the corner assembly of FIG. 6A.

FIG. 6A is a schematic view of a corner assembly 600 according to another embodiment of the present disclosure. FIG. 6B is a schematic side view of the corner assembly 600. FIG. 6C is a schematic sectional view of the corner assembly 600. The corner assembly 600 may be used in a wrapping device according to the present disclosure. For example, the corner assembly 600 may be used in a wrapping device in place of the corner assemblies 121, 127 discussed above. The corner assembly 600 is formed from a unitary body.

The corner assembly 600 may be formed from a sheet material by bending and cutting. The corner assembly 600 may include a long section 602 and a short section 604 bended along a line 606 to form an angular piece. An inner side of the corner assembly 600 is configured to face a pallet load during operation. Strap retainers 608, 610 may be formed an outer surface of the short section 604 and the long section 602 respectively. In some embodiments, the strap retainer 608, 610 may be formed by slitting a portion of the short section 604 and the long section 602 and pushing the slit portion outwards.

Figure 6D:
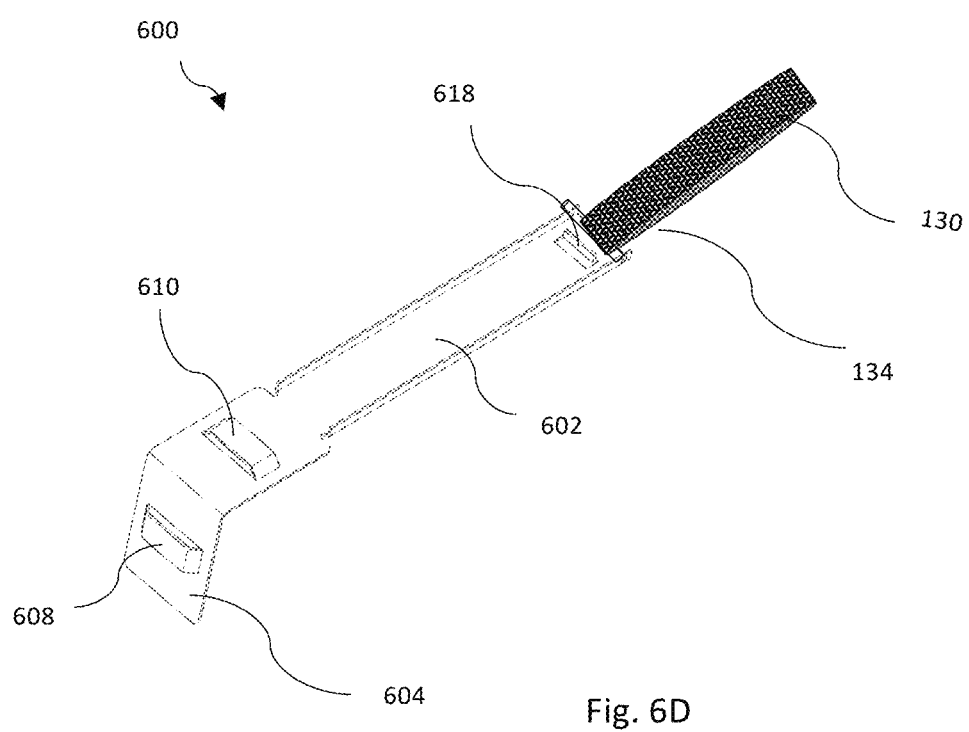
FIG. 6D is a schematic perspective view of the corner assembly of FIG. 6A in connection with a resilient member.

The long section 602 is configured to connect with a resilient member, such as the resilient member 130. FIG. 6D is a schematic perspective view of the corner assembly 600 in connection with the resilient member 130. The long section 602 may include side walls 612, 614. In some embodiments, the side walls 612, 614 may be formed by clipping edges of the long section 602 and rolled the edges towards the outer surface. The side walls 612, 614 create a volume in between for housing the resilient member. A shoulder 620 adjacent the side walls 612, 614 may function as a stopper for the slider bar disposed outside the corner assembly 600.

Notches 616 may be formed through the side walls 612, 614. The notches 616 may be configured to receive a pin, such as the pin 134, for securing to the resilient member 130. In some embodiments, a divider wall 618 formed in on the long section 602. The divider wall 618 may be positioned to prevent the resilient member from moving out.

Figure 6E:
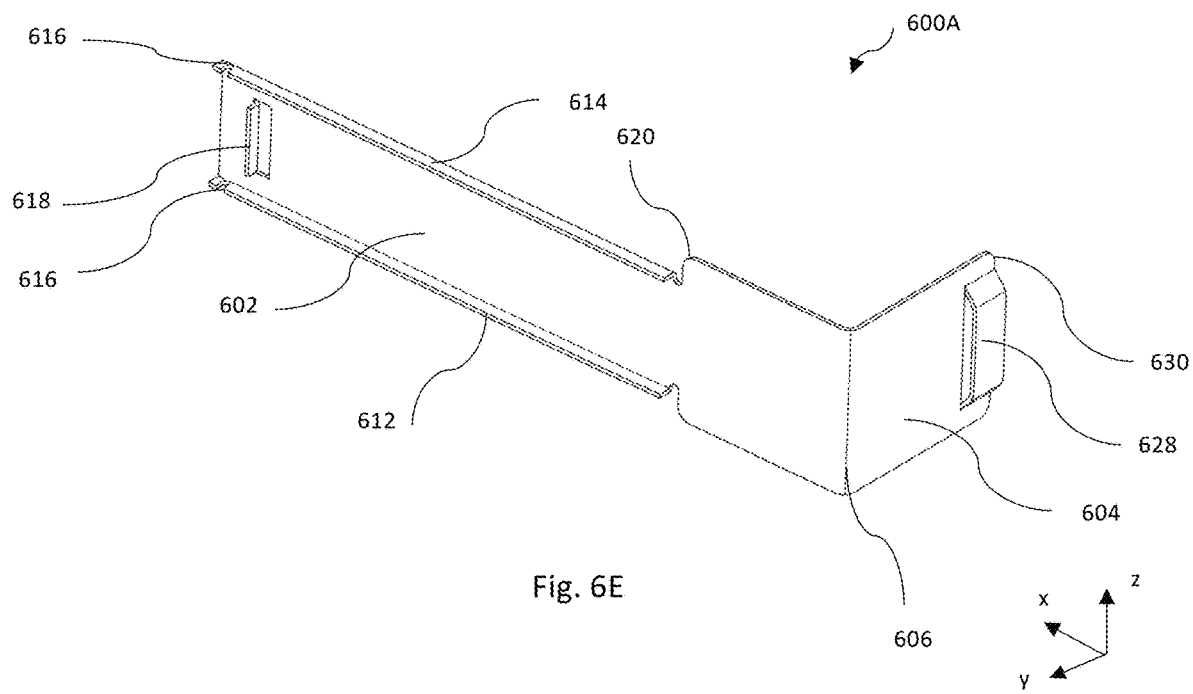
FIG. 6E is a schematic perspective view of a corner assembly according to another embodiment of the present disclosure.
Figure 6F:
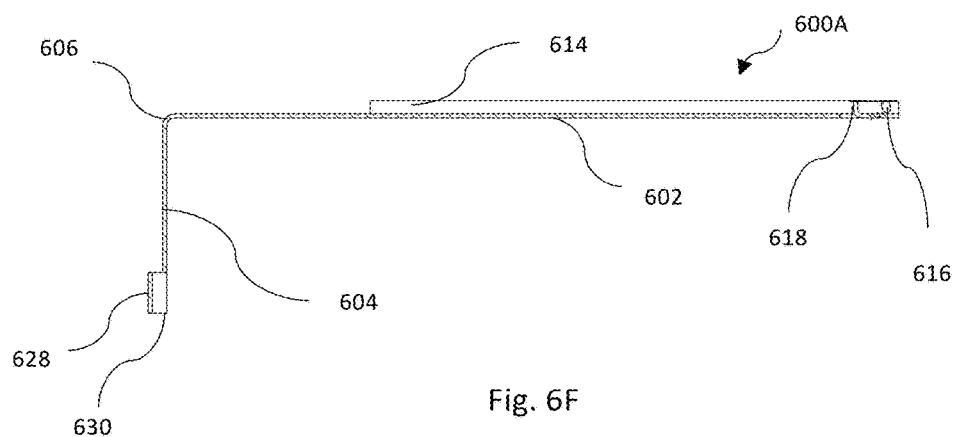
FIG. 6F is a schematic sectional view of the corner assembly of FIG. 6E.

FIG. 6E is a schematic perspective view of a corner assembly 600A according to another embodiment of the present disclosure. FIG. 6F is a schematic sectional view of the corner assembly 600A. The corner assembly 600A may be used in a wrapping device according to the present disclosure. For example, the corner assembly 600A may be used in a wrapping device in place of the corner assemblies 121, 127, 600 discussed above. The corner assembly 600A is formed from a unitary body.

The corner assembly 600A is similar to the corner assembly 600 discussed above except that the corner assembly 600A has different arrangement of strap retainers. Instead of having strap retainers on both the long section 602 and the short section 604, the corner assembly 600A includes a strap retainer 628 on the short section 604. For example, strap retainers are omitted on the long section 602 to lower manufacturing costs. In some embodiments, the strap retainer 628 is formed on an end 630 of the short section 604. Positioning the strap retainer 628 not only simplifies manufacturing process, but also reduces friction between the wrapping strap 102 and the corner assembly 600A during operation.

Figure 7:
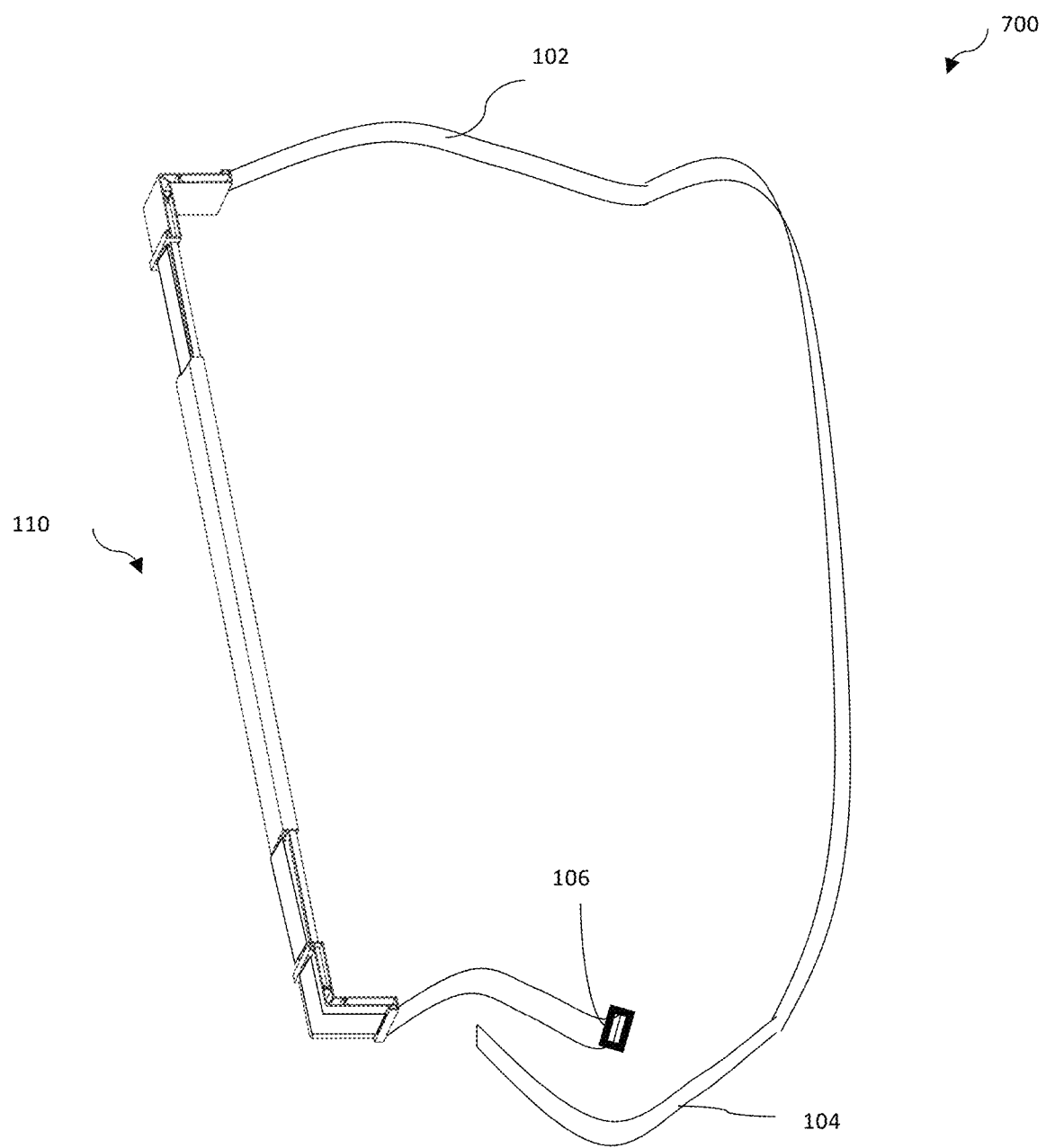
FIG. 7 is a schematic exploded view of a wrapping device according to another embodiment of the present disclosure.

FIG. 7 is a schematic exploded view of a wrapping device 700 according to another embodiment of the present disclosure. The wrapping device 700 is similar to the wrapping device 100 except that only one extendable bracket 110. The wrapping device 700 may be used to wrap pallet loads when only light binding is needed.

Some embodiments of the president disclosure provide a wrapping bracket. The wrapping device includes a first corner assembly, a second corner assembly, a resilient member connected between the first corner assembly and the second corner assembly, and a rigid cover disposed over the resilient member, wherein the first corner assembly and the second corner assembly are slidably connected to the rigid cover and movable relative to each other.

In one or more embodiments, each of the first corner assembly and second corner assembly comprises a corner unit, and a sliding bar, wherein a first end of the sliding bar is attached to the corner unit, and a second end of the sliding bar connected to the resilient member.

In one or more embodiments, the first end of the sliding bar is removably connected to the corner unit.

In one or more embodiments, each of the first corner assembly and second corner assembly further comprises a pin movably disposed in the second end of the sliding bar, wherein the resilient member is attached to the pin.

In one or more embodiments, the resilient member is a circular elastic band.

In one or more embodiments, each of the first corner assembly and second corner assembly includes a strap retainer configured to receive a wrapping strap therethrough.

In one or more embodiments, the rigid cover includes a body having a first channel and a second channel through a length of the body, the first channel is configured to receive the resilient member and the first and second corner assemblies, and a second channel is configured to receive a wrapping strap therethrough.

In one or more embodiments, each of the first corner assembly and second corner assembly is a unitary body having a long section and a short section formed in angle.

In one or more embodiments, the long section includes a shoulder, and the rigid cover is flush against the corner unit in a retracted position.

In one or more embodiments, the wrapping bracket further comprise a strap movably threaded through the first corner assembly and the second corner assembly, wherein two ends of the strap are joinable together to form a secure connection.

Some embodiments of the present disclosure provide a wrapping device. The wrapping device comprises a first extendable bracket comprising a first corner assembly, a second corner assembly, a resilient member connected between the first corner assembly and the second corner assembly, and a rigid cover disposed over the resilient member, wherein the first corner assembly and the second corner assembly are slidably connected to the rigid cover and movable relative to each other, and a strap movably threaded through the first extendable bracket.

In one or more embodiments, the wrapping device further includes a second extendable bracket, wherein strap is threaded through the second extendable bracket.

In one or more embodiments, each of the first corner assembly and second corner assembly comprises a corner unit, and a sliding bar, wherein a first end of the sliding bar is attached to the corner unit, and a second end of the sliding bar connected to the resilient member.

In one or more embodiments, wherein each of the first corner assembly and second corner assembly is a unitary body having a long section and a short section formed in angle.

In one or more embodiments, wherein the resilient member is a circular elastic band.

Some embodiments of the present disclosure provide a method for handling a pallet load. The method includes applying a first extendable bracket on the pallet load, wherein the first extendable bracket includes a first corner assembly and a second corner assembly connected by a first resilient member, and the first corner assembly is positioned along a first corner of the pallet load and the second corner assembly is positioned on a second corner of the pallet load, and tying a strap around the pallet load by joining two ends of the strap, wherein the strap is threaded through the first extendable bracket.

In one or more embodiments, applying the first extendable bracket comprises pulling the first corner assembly and the second corner assembly away from each other to position the first and second corner assemblies outside the first and second corners of the pallet load, and releasing the first and second corner assemblies onto the first and second corners of the pallet load so that the first extendable bracket clamps onto the pallet load.

In one or more embodiments, the method further includes applying a second extendable bracket on the pallet load, wherein the second extendable bracket includes a third corner assembly and a fourth corner assembly connected by a second resilient member, the third corner assembly is positioned along a third corner of the pallet load and the fourth corner assembly is positioned on a fourth corner of the pallet load, and the strap is threaded through the second extendable bracket.

In one or more embodiments, the method further includes threading the strap through the first extendable bracket prior to applying the first extendable bracket over the pallet load.

In one or more embodiments, the method further includes untying the strap, and pulling the first corner assembly and the second corner assembly away from each other to remove the first extendable bracket from the pallet load.

While the foregoing is directed to implementations of the present disclosure, other and further implementation of the disclosure may be devised without departing from the basic scope thereof, and the scope thereof is determined by the claims that follow.

The invention claimed is:

1. A wrapping bracket, comprising:
a first corner assembly;
a second corner assembly;
a resilient member connected between the first corner assembly and the second corner assembly, wherein the resilient member is an elastic band; and
a rigid cover disposed over the resilient member, wherein the first corner assembly and the second corner assembly are slidably connected to the rigid cover and movable relative to each other,
wherein each of the first corner assembly and the second corner assembly comprises:

a corner unit;

a sliding bar, wherein a first end of the sliding bar is attached to the corner unit, and a second end of the sliding bar is connected to the resilient member; and a pin movably disposed in the second end of the sliding bar, wherein the resilient member is attached to the pin.

2. The wrapping bracket of claim 1, wherein the first end of the sliding bar is removably connected to the corner unit.

3. The wrapping bracket of claim 1, wherein the elastic band is a circular elastic band.

4. The wrapping bracket of claim 1, wherein each of the first corner assembly and the second corner assembly includes a strap retainer configured to receive a wrapping strap therethrough.

5. The wrapping bracket of claim 4, wherein the rigid cover includes a body having a first channel and a second channel through a length of the body, the first channel is configured to receive the resilient member and the first and second corner assemblies, and the second channel is configured to receive the wrapping strap therethrough.

6. The wrapping bracket of claim 1, further comprising a strap movably threaded through the first corner assembly and the second corner assembly, wherein two ends of the strap are joinable together to form a secure connection.

7. A wrapping device, comprising:
a first extendable bracket comprising:
a first corner assembly;
a second corner assembly;
a resilient member connected between the first corner assembly and the second corner assembly, wherein the resilient member is an elastic band; and
a rigid cover disposed over the resilient member, wherein the first corner assembly and the second corner assembly are slidably connected to the rigid cover and movable relative to each other;
wherein each of the first corner assembly and the second corner assembly comprises:
a corner unit;
a sliding bar, wherein a first end of the sliding bar is attached to the corner unit, and a second end of the sliding bar is connected to the resilient member; and
a pin movably disposed in the second end of the sliding bar, wherein the resilient member is attached to the pin; and a strap movably threaded through the first extendable bracket.

8. The wrapping device of claim 7, further comprising a second extendable bracket, wherein the strap is threaded through the second extendable bracket.

9. The wrapping device of claim 7, wherein the elastic band is a circular elastic band.

10. A wrapping bracket, comprising:
a first corner assembly;
a second corner assembly;
a resilient member connected between the first corner assembly and the second corner assembly; and
a rigid cover disposed over the resilient member, wherein the first corner assembly and the second corner assembly are slidably connected to the rigid cover and movable relative to each other,
wherein each of the first corner assembly and the second corner assembly includes a strap retainer configured to receive a wrapping strap therethrough, the rigid cover includes a body having a first channel and a second channel through a length of the body, the first channel is configured to receive the resilient member and the first and second corner assemblies, and the second channel is configured to receive the wrapping strap therethrough.

11. The wrapping bracket of claim 10, wherein each of the first corner assembly and the second corner assembly comprises:
a corner unit; and
a sliding bar, wherein a first end of the sliding bar is attached to the corner unit, and a second end of the sliding bar is connected to the resilient member.

12. The wrapping bracket of claim 11, wherein each of the first corner assembly and the second corner assembly further comprises:
a pin movably disposed in the second end of the sliding bar, wherein the resilient member is attached to the pin.

13. The wrapping bracket of claim 12, wherein the resilient member is an elastic band.

14. The wrapping bracket of claim 13, wherein the elastic band is a circular elastic band connecting between the pins of the first corner assembly and the second corner assembly.

* * * * *